United States Patent [19]

Chauveau et al.

[11] Patent Number: 4,721,328
[45] Date of Patent: Jan. 26, 1988

[54] OSCILLATING ARM SUSPENSION UNIT FOR VEHICLES

[75] Inventors: Jean-Marc Chauveau, Chaville; Claude A. Chambon, Orsay, both of France

[73] Assignee: Lucas France S.A., Paris, France

[21] Appl. No.: 909,778

[22] Filed: Sep. 19, 1986

[30] Foreign Application Priority Data

Sep. 19, 1985 [FR] France .................... 85 13934

[51] Int. Cl.⁴ .................... B60G 11/32; B60G 11/26
[52] U.S. Cl. .................... 280/705; 280/698; 280/709
[58] Field of Search .............. 280/683, 698, 702, 705, 280/709, 660, 662

[56] References Cited

U.S. PATENT DOCUMENTS

4,254,970 3/1981 Petrick .................... 280/705
4,537,422 8/1985 O'Rourke .................... 280/705

*Primary Examiner*—Richard A. Bertsch
*Attorney, Agent, or Firm*—Blakely, Sokoloff, Taylor & Zafman

[57] ABSTRACT

A suspension unit for vehicles comprises a support fastened to a framework of the vehicle and a longitudinal arm, with a rolling member coupled to the arm, rotating relative to it about a transverse first axis. The arm is coupled to the support and rotates relative to it about a transverse second axis which is parallel to the first axis and offset relative to it in the longitudinal direction. Within the arm is a longitudinal cylinder within which slides a piston. A rod is coupled to the piston and to the support. The rod rotates relative to the support about a third axis parallel to the second axis and offset relative to it transversely. The rod rotates relative to the piston about a transverse fourth axis parallel to the third axis. It is pivoted to the piston by a mechanism comprising a slide member that slides longitudinally within the cylinder and is juxtaposed longitudinally to the piston on the same side as the rod. The rod is pivoted to the slide member for rotation about the fourth axis.

10 Claims, 4 Drawing Figures

OSCILLATING ARM SUSPENSION UNIT FOR VEHICLES

BACKGROUND OF THE INVENTION

1. Field of the Invention

The present invention concerns an oscillating arm suspension unit for vehicles.

To be more precise, it concerns a suspension unit of the type comprising:

a support adapted to be fastened to a framework of the vehicle, a longitudinal arm, means coupling a rolling member to the arm defining a transverse first axis about which the rolling member rotates relative to the arm, means coupling the arm to the support defining a transverse second axis about which the arm rotates relative to the support, the second axis being parallel to the first axis and offset relative to it in a longitudinal direction, a longitudinal cylinder within the arm, a piston slidable longitudinally within the cylinder and delimiting with it a fluid-tight enclosure, a compressible fluid in the enclosure serving as spring means, a rod linking the piston and the support, means pivoting the rod to the support for rotation about a transverse third axis parallel to the second axis and offset relative to it transversely, and means pivoting the rod to the piston for rotation about a transverse fourth axis parallel to the third axis.

2. Description of the Prior Art

In known suspension units of this type, the means coupling the rod to the piston comprise a direct articulation of the rod to the piston about the fourth axis.

Movements of the suspension, that is to say rotation of the arm about the second axis relative to the support, necessarily result in an oblique disposition of the rod relative to the longitudinal direction of the cylinder, in certain angular positions of the arm relative to the support, and this oblique disposition results in the application to the piston by the rod of forces that are themselves oblique relative to the longitudinal direction of the cylinder; the longitudinal component of these forces results in longitudinal displacement of the piston relative to the cylinder in the manner required, but the transverse component of these forces results in increased friction between the piston and the cylinder, impeding longitudinal movement of the piston; also, given that the transverse forces to which the piston is subjected are transmitted to the cylinder through the seals, pivoting movement of the rod relative to the piston around the fourth axis results in varying compression of the seals between the piston and the cylinder which may lead to premature deterioration of the seals and the appearance of leaks between the piston and the cylinder.

These disadvantages are all the more significant in that the suspension arm tends to flex between its axis of rotation relative to the support and the axis of rotation of the rolling member relative to the arm, which results in deformation of the cylinder essentially in a plane perpendicular to the various axes of rotation, which is precisely the plane in which are developed the transverse components of force when the rod is offset angularly relative to the longitudinal direction of the cylinder; deformation of the arm then results in the appearance of additional transverse components of force between the piston and the cylinder and an increased risk of deterioration of the seals and appearance of leaks.

An object of the present invention is to alleviate these disadvantages.

SUMMARY OF THE INVENTION

The present invention consists in a suspension unit for vehicles comprising:

a support adapted to be fastened to a framework of the vehicle, a longitudinal arm, means coupling a rolling member to the arm defining a transverse first axis about which the rolling member rotates relative to the arm, means coupling the arm to the support defining a transverse second axis about which the arm rotates relative to the support, the second axis being parallel to the first axis and offset relative to it in a longitudinal direction, a longitudinal cylinder within the arm, a piston slidable longitudinally within the cylinder and delimiting with it a fluid-tight enclosure, a compressible fluid in the enclosure serving as spring means, a rod linking the piston and the support, means pivoting the rod to the support for rotation about a transverse third axis parallel to the second axis and offset relative to it transversely, and means pivoting the rod to the piston for rotation about a transverse fourth axis parallel to the third axis and comprising:

a slide member sliding longitudinally within the cylinder and juxtaposed longitudinally to the piston on the same side as the rod, means pivoting the rod to the slide member to rotate about the fourth axis, and means coupling the slide member to the piston and permitting mutual transmission of longitudinal forces but not permitting mutual transmission of transverse forces.

In this way only the slide member is subjected to transverse components of forces resulting from the oblique disposition of the rod relative to the longitudinal direction of the cylinder, whereas the piston is subject only to longitudinal forces by the rod; thus the piston may be considered as being free in the transverse direction within the cylinder, so that movements of the rod and flexing of the arm have virtually no influence on the compression of the seals between the piston and the cylinder, that is to say on the durability of the seals or on the ease with which the piston slides longitudinally within the cylinder.

The structure in accordance with the invention does not mean that the disadvantages manifesting themselves at the level of the piston and the seals between it and the cylinder in a conventional structure are merely transferred to the level of the slide member, to the degree that it may be satisfactory to procure the contact between the slide member and the cylinder in a manner just sufficient to ensure guiding of relative longitudinal sliding between them without it being necessary to provide any seal at this level; to the contrary, in one preferred embodiment of the present invention means such as channels passing longitudinally through the slide member from one end to the other are provided to feed a lubricant between the slide member and the piston in order optimally to lubricate both them and their mutual coupling means; these advantageously consist in mutual abutment means in the direction in which they move towards each other longitudinally, the action of the compressible fluid serving as spring means resulting in permanent contact between these mutual abutment means; thus the transverse components of force to which the slide member may be subjected are transmitted to the piston to only a negligible degree.

The cylinder is advantageously defined by a longitudinal liner within and attached to the arm, which also makes it possible to reduce deformation of the cylinder resulting from flexing of the arm and the consequences of such deformation.

Other characteristics and advantages of the invention will emerge from the following description of one embodiment given by way of non-limiting example only and with reference to the appended drawings which form an integral part of the description.

BRIEF DESCRIPTION OF THE DRAWINGS

FIG. 4 is a view of the suspension unit in the state of static equilibrium in partial cross-section on the line IV—IV in FIG. 3 parallel to the line I—I; FIG. 4 also represents schematically a hydraulic circuit forming part of damper means with which the suspension unit illustrated is provided.

DESCRIPTION OF THE PREFERRED EMBODIMENT

The suspension unit 1 is shown in equilibrium positions that it can assume when it is mounted on a vehicle, schematically represented by its framework 2, with the vehicle resting on a horizontal plane through a rolling member schematically represented at 3, such as a road wheel or a caterpillar track roller, depending on the type of vehicle in question.

The unit 1 will be described with reference to these positions and these equilibrium states, and it is to be understood that such terms as horizontal, vertical, level and direction used in this description have no limiting character and are to be interpreted as a simple indication of the relative positions of the various component parts of the suspension unit 1.

For mounting it on the framework of the vehicle the suspension unit 1 illustrated comprises a support 4 in the form of a vertical plate 6 which may be fastened to the framework of the vehicle, by means of bolts 5, for example, and to which is fastened, for example by being formed in one piece with it, a shaft 7 a transverse second axis 8 (a transverse first axis being described hereinbelow) of which is horizontal, perpendicular to the plate 4; when the support 4 is attached to the framework 2 of the vehicle the shaft 7 projects externally of the vehicle.

Figure 2:
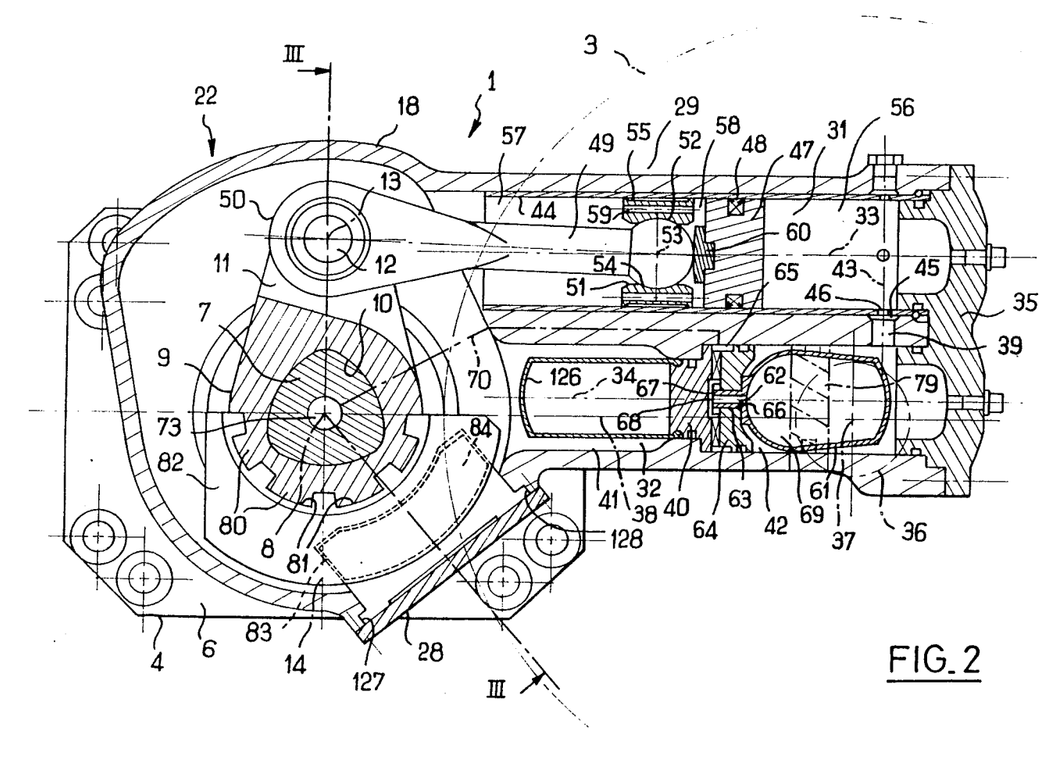
FIG. 2 is a view of the unit in partial cross-section on the line I—I in FIG. 3, in a state of dynamic equilibrium.

The shaft 7 carries a crank 9 which is prevented from rotating relative to the shaft 7 about its axis 8 by an arrangement of complementary shapes; the crank 9 has a bore 10 through which the shaft 7 passes and, transversely to the axis 8, the bore 10 and the shaft 7 have respective complementary polygonal cross-sections, as shown in FIG. 2; any other means of fastening the crank 9 and the shaft together, in particular to prevent relative rotation about the axis 8, may be used without departing from the scope of the present invention; a conventional keying arrangement may be used, for example, or cooperation between the bore 10 and the shaft 7 by means of complementary splines.

Above the shaft 7 the crank 9 forms a yoke 11 to which is fastened a journal 12 a transverse third axis 13 of which is parallel to, above and in a common vertical plane 14 with the axis 8; like the axis 8, this axis 13 is fixed relative to the support 4; on respective opposite sides of the yoke 11 in a direction parallel to the axis 8, the crank 9 defines two integral sleeves 20 and 21 respectively situated between the yoke 11 and the plate 6 and on the opposite side of the plate 6 relative to the yoke 11; to each of the sleeves 20 and 21 is fastened the inner cage of a respective thrust bearing 16, 17 having an outer cage respectively fastened to a casing 18 and a flange 19, these being annular and fastened to each other, so as to guide the casing 18 and the flange 19 in rotation about the axis 8 relative to the crank 9 and the shaft 7 without any possibility of relative translation movement parallel to the axis 8; to this end, the inner cages of the bearings 16 and 17 are also respectively trapped between the plate 6 and the yoke 4 and between the yoke 11 and an abutment plate 93 fastened to the member 7, by means of bolts 92, for example, opposite the attachment of the shaft 7 to the plate 6.

The casing 18 is fluid-tight and surrounds the crank 9 on the same side as the plate 6 of the support 4 and in the radial direction away from the axis 8; around the bearing 16 and the sleeve 20 the casing 18 has an annular ring 23 which is a body of revolution about the axis 8, projecting towards the plate 6 and inserted in a complementary groove 24 formed in the plate 6 so that it is able to rotate about the axis 8; the plate 6, which is itself fluid-tight, and the ring 23, which is also fluid-tight, are sealed to each other by sealing means 25, 26 the nature and location of which are easy to determine for those skilled in the art.

The flange 19, which is also fluid-tight, is fastened in fluid-tight manner to the casing 18 and covers the crank 9 on the side opposite the casing 18; it has an orifice in the shape of a body of revolution about the axis 8 which is shut off in fluid-tight manner by a cover 27 in the general shape of a disk perpendicular to the axis 8 and attached to it; similarly, an orifice in the casing 18 is shut off in fluid-tight manner by a cover 28 attached to it, in such a way that the support 4, the casing 18, the flange 19, the cover 27 and the cover 28 together define a fluid-tight housing 22 enclosing the crank 9, the journal 12 and the two bearings 16 and 17.

As will emerge hereinafter, the housing 22 contains a substantially incompressible hydraulic fluid, in practise oil, which fills to the maximum the housing 22 which may also contain air.

Figure 3:
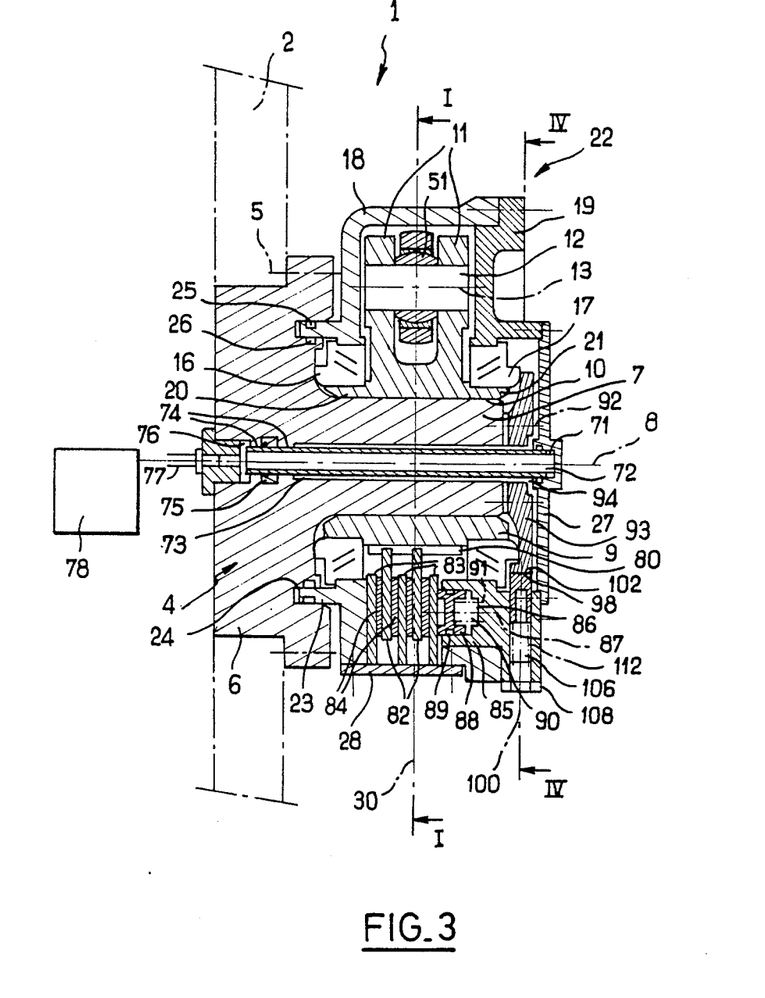
FIG. 3 is a view of the suspension unit in cross-section on the broken line III—III in FIG. 2.

The casing 18 carries a longitudinal hollow arm 29 projecting relative to the housing 22 in a plane 30 perpendicular to the axis 8 and coincident with the section plane I—I in FIG. 3; the arm is preferably in one piece with the casing 18.

Figure 1:
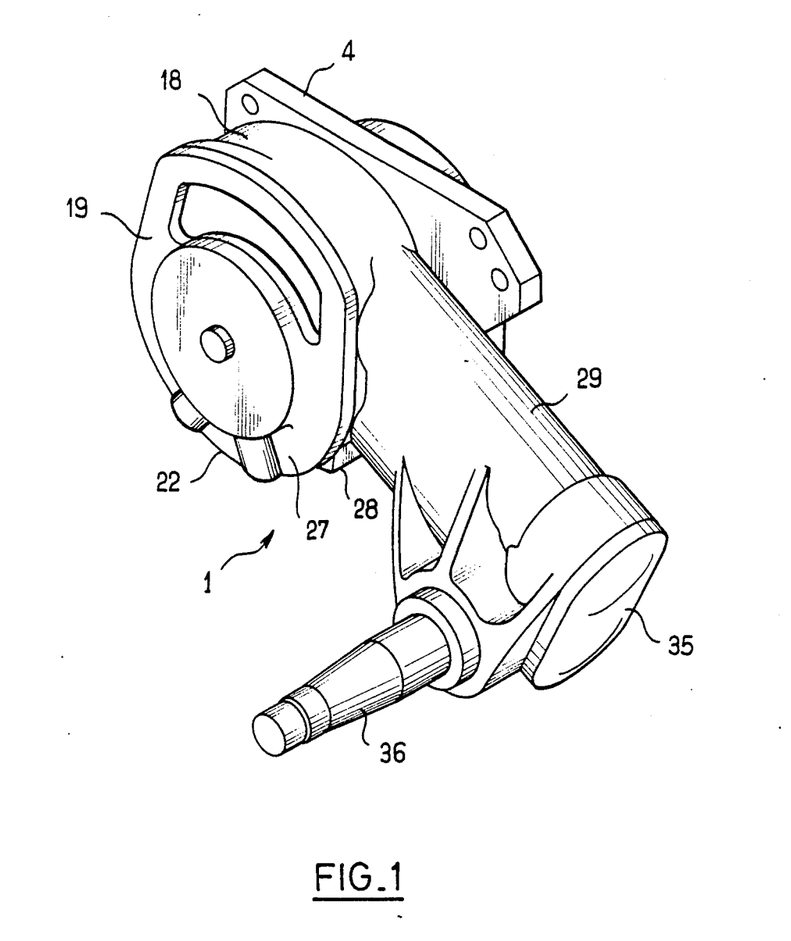
FIG. 1 is a perspective view of a suspension unit in accordance with the present invention, in a state of static equilibrium as when mounted on a vehicle resting on a horizontal plane.
Figure 4:
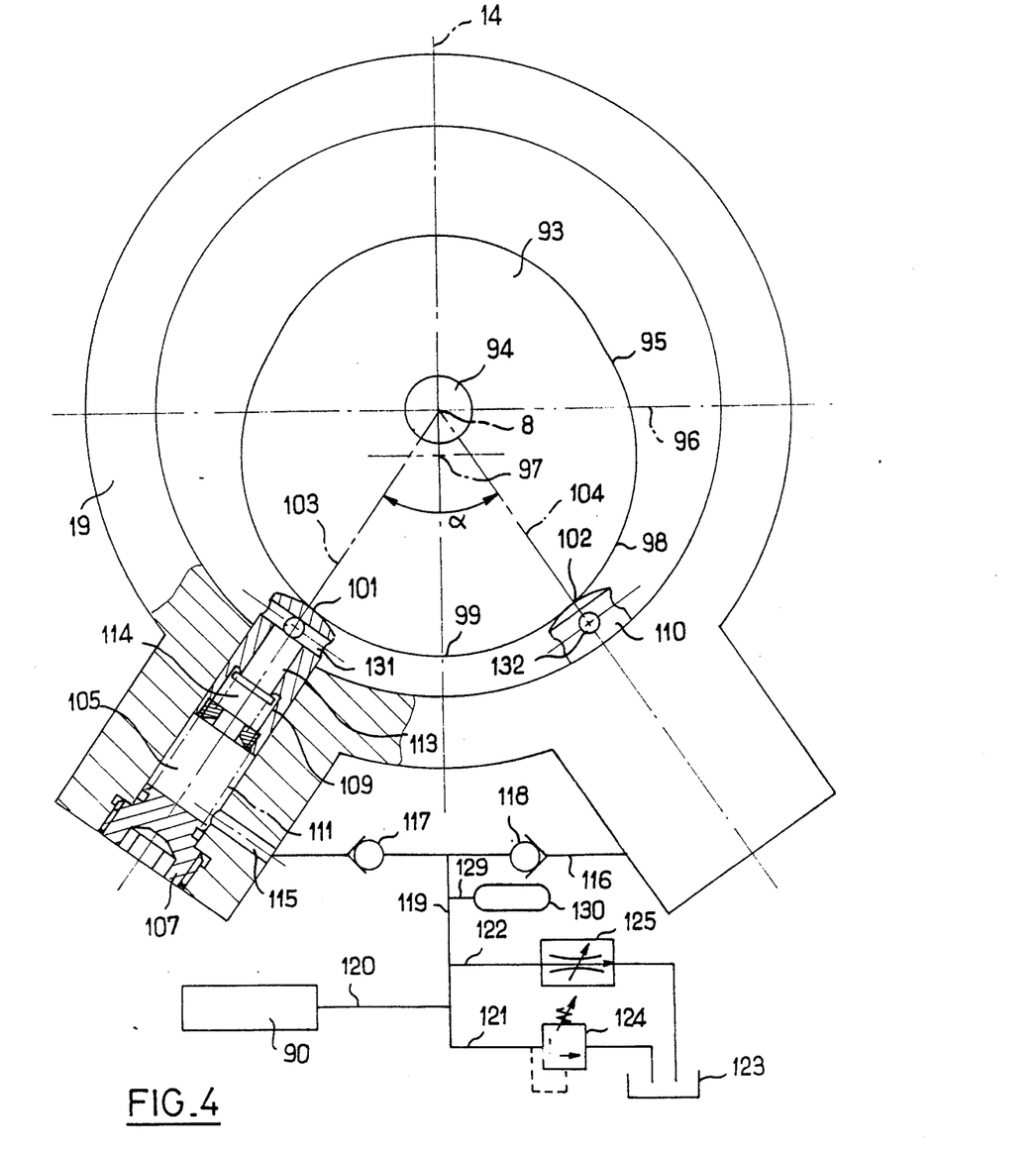

The arm 29 is shown in a horizontal orientation in FIG. 2 but it is to be understood that it can rotate with the housing 22, to which it is fastened, about the axis 8 and relative to the support 4; the arm extends obliquely downwards from the housing 22 in the position shown in FIGS. 1 and 4.

Opposite the end where it is connected to the casing 18 of the housing 22, the arm carries a spindle 36 fastened to it, and advantageously in one piece with it, to guide rotation of the rolling member 3 relative to it about a transverse first axis 37 parallel to the axis 8; in the condition shown in FIG. 2, a plane 38 common to the axes 8 and 37 is horizontal but it can equally well be oblique provided that variations in the relative levels of the framework 2 of the vehicle and the rolling member 3 result in rotation of the arm 29 relative to the support 2 about the axis 8.

The arm 29 is hollow, comprising two tubular cavities 31 and 32 with respective rectilinear longitudinal axes 33 and 34 parallel to each other and to the plane 38 and situated in the plane 30 so that the cavity 31 is above the cavity 32, the axes 33 and 34 are both above the plane 38, and the axis 33 of the upper cavity 31 intersects the plane 14 in the immediate vicinity of the axis 13.

At one transverse end, where the arm 29 is fastened to the casing 18, the cavities 31 and 32 communicate unrestrictedly with the interior of the housing 22 whereas at their other transverse end, constituting the area of the arm 29 farthest away from the housing 22, they are closed by fluid-tight cover 35 fastened in fluid-tight manner to the arm 29 which is itself fluid-tight.

Approximately halfway between its two transverse ends, the lower cavity 32 is permanently closed off by a fluid-tight bulkhead 40 attached to the arm 29 so that the lower cavity 32 comprises, in the immediate vicinity of the casing 18, a chamber 41 communicating directly with the interior of the housing 22 and, in the immediate vicinity of the cover 35, a chamber 42 communicating permanently with the cavity 31 through a fluid passage hole 39 formed between the two cavities 31 and 32 in a direction 43 perpendicular to the axes 33 and 34.

As shown, the cavity 31 is preferably lined with a longitudinal tubular liner 44 in which are one or more orifices 46 facing the hole 39 and an annular groove 45 in the shape of a body of revolution about the axis 33 of the liner, through which the hole 39 discharges into the cavity 31 in the vicinity of the cover 35.

The liner 44 facilitates guidance of longitudinal sliding within the tubular cavity 31 of a fluid-tight piston 47 sealed to the liner 44 by appropriate sealing means 48 and coupled by a rod 49 to the journal 12 attached to the crank 9, so that angular movement of the arm 29 about the axis 8 relative to the support 9 result in longitudinal sliding movement of the piston 47 within the cavity 31, in one direction or the other.

To this end the rod 49 has a first end 50 by which it is pivoted to the journal 12, preferably through the intermediary of a ball joint device 51, so as to be able to pivot about the axis 13 relative to the crank 9; the rod 49 also has a second end 51 disposed within the cavity 31 and itself in the shape of a part-spherical ball 52 the center of which is maintained on the axis 33 by engagement of the ball 52 in a concentric part-spherical bearing surface 54 of an annular slide member 55 in the shape of a body of revolution about the axis 33, which slide member is mounted in the liner 44 on the same side of the piston 47 as the axis 13 so as to be able to slide longitudinally.

The piston 47 is fluid-tight and sealed to the liner 44 so as to delimit with the tubular cavity 31 a fluid-tight chamber 56 situated on the same side as the cover 35 and communicating permanently with the chamber 42 in the cavity 32 and a chamber 57 situated on the same side as the housing 22, with which it communicates, the chamber 57 containing the slide member 55 and the ball member 52; the slide member 55 is designed to allow the hydraulic fluid contained in the housing 22 and in the chamber 57 to pass freely into a space 58 between the slide member 55 and the piston 47; to this end, longitudinal passages 59 are provided in the slide member 55, around the part-spherical bearing surface 54; thus the fluid contained in the housing 22 and the chamber 57 can reach the space 58 and lubricate the slide member 55 and the piston 47 where they are in contact with the liner 44 and the ball member 52 where it is contact with the part-spherical bearing surface 54, as well as where it is in contact with a buffer 60 fastened to the piston 47 on the same side as the chamber 57 to serve as longitudinal abutment means for the piston 47 against the ball member 52, which by virtue of the annular shape of the slide member 55 is totally exposed on the side facing towards the piston 47; this preferred arrangement makes it possible to procure as direct as possible transmission of longitudinal forces between the rod 49 and the piston 47 with minimum transverse loading of the piston 47 by the rod 49; other arrangements could naturally be adopted, for example with the piston 47 abutting not against the rod 49 but against the slide member 55; the way in which the rod 49 is fitted, in particular to the slide member 55, could also be different, provided that it defined at least one relative rotation axis parallel to the axis 13 and intersecting the plane 50 coincident with the center 53 of the ball member 52 said axis coincident with the center 53 being a transverse fourth axis and the part-spherical bearing surface 54 of the design as shown.

The piston 47 is urged longitudinally towards the slide member 55 to procure mutual abutting of the buffer 60 and the ball member 52, by means of a compressible fluid, in practise a gas, serving as pneumatic spring means, accommodated in the communicating chambers 56 and 42 and operative directly on the piston 47 in the chamber 56; the hole 39, the groove 45 and the orifice or orifices 46 are of such sizes as to offer virtually no resistance to passage of this fluid from one of the chambers 56 and 42 to the other, that is to say in such a way as not to cause any throttling of the fluid when the piston 42 slides longitudinally within the liner 44.

In the chamber 42 the compressible fluid serving as spring means bathes an elastically expandable, flexible, fluid-tight material bladder 61 which features in the direction towards the bulkhead 40 along the axis 34 an orifice 62 advantageously delimited by a termination 67 forming an integral part of the bladder 61 and projecting along the axis 34 towards the bulkhead 40; by its radially outermost periphery 63 relative to the axis 34, the termination 67 is inserted into a bore 66 along the axis 34 in a fluid-tight wall 64 fastened in fluid-tight manner into the cavity 32, transversely to the axis 34, so as to cover the bulkhead 40 on the side towards the chamber 42 and delimit with the bulkhead 40, in the cavity 32, an intermediate volume 65 which is fluid-tight with respect to the chamber 41 and the remainder of the chamber 42; all of the outside periphery 63 of the termination 67 is in fluid-tight contact with the wall 64, which defines through the latter a passage 68 connecting the interior of the bladder 61 with the volume 65 whilst preserving the fluid-tightness of the latter relative to the part of the chamber 42 external to the bladder 61, in other words vis-à-vis the compressible fluid filling the chamber 42, outside the bladder 61, and 56; the fluid-tight contact between the termination 67 and the wall 64 may result from a simple interference fit of the termination 67 within the bore 66, for example.

The bladder 61 thus delimits internally, within the chamber 42, a chamber 69 which is intended to receive a substantially incompressible hydraulic fluid through the intermediary of the volume 65, this fluid serving to reduce the space available within the chamber 42 for the compressible fluid serving as spring means and, by varying the volume of the chamber 69 as a result of addition of the substantially incompressible hydraulic fluid 2 to or removal of it from this chamber, to oblige a greater or lesser quantity of the compressible fluid to remain in the chamber 56 so as to vary the longitudinal position of the piston 47 in the liner 44 corresponding to equilibrium between the weight of the vehicle and the reaction force on the rolling member from the ground, in other words to vary the ground clearance.

To achieve this, conduits schematically represented by a chain-dotted line 70 are formed within the arm 58, the flange 19 and the cover 27, in a manner that will be readily apparent to those skilled in the art, so as to connect the intermediate volume 65 between the bulkhead 40 and the wall 64 with a chamber 71 formed in the cover 67 and along the axis 8, as can be seen in FIG. 3; the chamber 71 facing the shaft 7 along the axis 8 accommodates one end of a tube 72 on the axis 8 which is fixedly secured and sealed to the cover 27 and which passes through the shaft 7 along the axis 8 as far as the plate 6 by means of a bore 73 formed in the shaft 7 with dimensions such that there remains a peripheral clearance between the tube 72 and the shaft 7; at the plate 6 the tube 72 is guided in rotation relative to the support 4 and about the axis 8 by a bearing 74 fitted with a rotary seal 75 and connects to a fluid-tight chamber 76 formed in the plate 6 and itself connected by a conduit 77 to means 78 for adding or removing predetermined amounts of the substantially incompressible fluid; the means 78, which are known in themselves, may comprise a hydraulic pump connected to a hydraulic fluid storage tank within the vehicle, for example.

In an alternative embodiment of the device that has just been described, the bladder 61 could be eliminated and replaced with a piston 79, as schematically indicated in chain-dotted line in FIG. 2, mounted to slide longitudinally within the chamber 42 so as to divide this in fluid-tight manner into a part-chamber communicating directly with the chamber 56 through the hole 39 and a part-chamber corresponding to the chamber 69 in fluid communication with the volume 65 through the bore 70 in the wall 64.

Also, in a manner that is not illustrated and is subject to satisfactory conditions for mutual disposition of the components of the suspension unit 1, the chambers 56 and 42 connected via the hole 39 in the embodiment shown could be in non-parallel alignment with each other and/or relative to the plane 38, in the plane 30 or offset relative thereto; in particular, the chambers 56 and 42 could be aligned with each other along the axis 33, for example, in which case there would be aligned with this same axis the piston 47, the combined chambers 56 and 42, the bladder 61 or the piston 79, the chamber 69 and the wall 64, which could then be defined by a cover substituted for the cover 35; this embodiment is not illustrated but implementing it on the basis of the embodiment illustrated and prevously described lies well within the competence of those skilled in the art.

The device that has just been described constitutes a pneumatic spring with provision for adjusting the ground clearance and may be used as such on a vehicle.

However, it may also be provided with means for damping rotational movement of the arm 29 relative to the support 4 about the axis 8.

In this instance these damper means consist of brake means operative between members respectively fastened to the arm 29 and the support 4, resisting relative rotation about the axis 8 with a braking force conditioned by the rotation speed of the arm 29 relative to the support 4.

To this end, in the illustrated embodiment, the crank 9 carries towards the bottom, that is to say at the opposite end from the yoke 11, a plurality of dovetail-shaped ribs 80 parallel to the axis 8 on which can slide parallel to this axis but not rotate about this axis complementary shape grooves 81 formed in brake disk sectors 82 which are juxtaposed along the axis 8 relative to which they are disposed in respective perpendicular planes; there are two brake disk sectors 82 in the example illustrated, but one only of the sectors could suffice as likewise could more than two.

The brake disk sectors 82 are naturally disposed within the housing 22, like the crank 9, between the casing 18 and the flange 19.

Through the intermediary of the cover 28 the housing 22 carries a plurality of blade members 83 disposed in respective planes perpendicular to the axis 8 and located in the dihedron defined by the planes 38 and 14, beneath the plane 38 and on the same side of the plane 14 as the arm 29; the number and arrangment of the blade members 83 is such that each disk sector 82 is disposed between two such blade members; in other words, in the embodiment illustrated three blade members 83 are provided, one of which is disposed between the two disk sectors 82 while the other two are placed on respective sides of the assembly formed in this way by the two disk sectors 82 and the blade member 83 between them.

Each of the outside blade members 83 carries a known type brake lining 84 facing towards the immediately adjacent disk whereas the blade member 83 between the two disk sectors 82, or each such blade member, carries a brake lining 84 on either side.

To bring the brake linings 84 and the brake sectors 82 into contact under controled pressure their angular dimension relative to the axis 8 is such that contact with the brake linings 84 may be established in all relative positions of the arm 29 and the support 4 resulting from relative rotation about the axis 8 within the normal operating limits, the blade members 83 cooperating with conjugate-shaped grooves 127, 128 parallel to the axis 8 and defined conjointly by the cover 28 and the casing 18; these grooves 127, 128 guide the blade members 83 so that they slide in the direction parallel to the axis 8; the blade member 83 nearest the plate 6 of the support 4 bears against the casing 18 parallel to the axis 8, while the blade member 83 farthest away from the support 4, that is to say nearest the flange 19, is acted on by a hydraulic jack 85 which pushes on the blade member 83 so as to apply a predetermined force parallel to the axis 8 to the blade member 83 and through the blade member 83 to the set of disk sectors 82 via the linings 84.

To this end the flange 19 features at least one blind hole 86 facing towards the support 4, that is to say towards the interior of the housing 22, with its axis 87 parallel to the axis 8, and facing the plate 83 nearest the flange 19; this blind hole constitutes a cylinder within which a piston 88 sealed to the blind hole 86 by sealing means 89 can move in the direction of the axis 87, defining a fluid-tight chamber 90 within the blind hole 86; a helical compression spring 91 schematically shown in chain-dotted line is advantageously accommodated in the chamber 90 to provide a minimal contact pressure between the brake linings 84 and the disk sectors 82 in the absence of any pressurized fluid in the chamber 90.

The chamber 90 also contains a fluid the pressure of which is varied according to the rotation speed of the arm 29 about the axis 8 relative to the support 4, according to predetermined laws of which certain examples will be described by way of non-limiting illustration hereinafter.

For the purposes of achieving such control over the pressure of this fluid in the case of the embodiment of the invention shown in FIGS. 3 and 4, the shaft 7 carries a cam which is fastened to it, for example by bolts 92, within the housing 22 and directly facing the cover 27, the cam lying in a plane 100 perpendicular to the axis 8 and advantageously consisting, in the embodiment shown, of the abutment plate 93 attached to the shaft 7; this cam is seen particularly clearly in FIG. 4.

Along the axis 8 the cam 93 is pierced by a bore 94 through which the tube 72 passes with clearance comparable with that of the bore 73; in the radial direction away from the axis 8 and in any section plane perpendicular to this axis, its outside periphery 95 is of oval shape.

Above a horizontal plane 96 in which the axis 8 lies and which is fixed relative to the support 4 the shape of this periphery is immaterial provided that the cam 93 serves as an abutment plate, as previously described; below the plane 96 it is of circular shape with an axis 97 parallel to the axis 8 and situated in the plane 14 under the axis 8, so as to define a cam surface 98 featuring, under the axis 8 and in the plane 14, a point 99 which constitutes the point on the cam surface 98 farthest from the axis 8, the distance from the axis progressively decreasing for points on the cam surface 98 further and further away from the point 99 in one direction of movement of the surface 98 resulting from rotation about the axis 8 or in the opposite direction.

In the plane 100 of the cam 93, taken as the plane of its cam surface 98 and coincident with the section plane IV—IV in FIG. 3, the flange 19 has two cam followers 101 and 102 facing the cam surface 98 each fastened to the flange 19 in terms of rotation about the axis 8 but able to slide relative to the flange 19 in the radial direction relative to the axis 8 so as to remain in contact with the cam surface 98 whatever the angular position of the arm 29 relative to the support 4, for rotation about the axis 8, within the normal operating limits.

To this end the flange 19 comprises two bores 105 and 106 with respective axes 103 and 104 which are radial relative to the axis 8 and situated in the plane 100; each of the bores 105 and 106 discharges into the housing 22, towards the cam surface 98, being shut off at the opposite end by a respective plug 107, 108; the axes 103 and 104 are symmetrically positioned to each other relative to a plane coincident with the vertical plane 14 in the state of static equilibrium shown in FIGS. 1 and 4, with a mutual angular offset α of the axes 103 and 104 relative to the axis 8; this angular offset α is at least equal to the range of relative angular displacement between the arm 29 and the support 4 about the axis 8 under normal operating conditions; in the example illustrated this offset is in the order of 70°; this figure is given by way of non-limiting example only, of course.

Within each of the bores 105 and 106 is a respective piston 109, 110 sliding along the axis 103, 104 of the bore with a respective helical compression spring 111, 112 disposed between the piston and the plug shutting off the corresponding bore urging the pistons 109, 110 elastically towards the axis 8 so that each projects out of the corresponding bore 105, 106 into the housing 22 and bears against the cam surface 98 through an end surface that is transverse relative to the axis of the corresponding bore, which surface defines the cam follower 101, 102.

Thus rotation of the arm 29 and of the axes 103 and 104 with it about the axis 8 relative to the support 4 and to the cam 93 results in alternating reciprocating movement of the two pistons 109 and 110 in the respective bores 105, 106 along the axes 103, 104 of the these bores; the cam is shaped according to the relative positions of the axes 103 and 104 so that movement of the arm 29 on rotation relative to the support 4 from the state of static equilibrium results, irrespective of the direction and amplitude of this movement within normal operating limits, in opposed movements of pistons 109, 110 in the bores 105, 106; thus in the example illustrated where the axes 103 and 104 are at 70° to each other and the cam surface 98 subtends an angle of at least 180° (at least 2α) at the axis 97, symmetrically distributed to either side of the plane 14, and if it is assumed that displacement of the arm 29 on rotation of the axis 8 relative to the support 4 from a position of the plane 38 corresponding to static equilibrium is limited to a maximum of 35° (α/2) upwards or downwards, upward rotation of the arm 20 from the static equilibrium position results in:

movement of the point of contact with the cam surface 98 of the follower 102 defined by the piston 110 accommodated in the bore 106 on the same side of the plane 14 as the arm 29 when the plane 38 is horizontal away from the point 99, that is to say protrusion of the piston 110, movement of the point of contact with the cam surface 98 of the cam follower 101 defined by the piston 109 corresponding to the bore 105 situated on the other side of the plane 14 when the plane 38 is horizontal towards the point 99, that is to say retraction of the piston 109 into the bore 105.

Rotation in the opposite direction produces the converse effect.

Other respective orientations of the cam surface 98 and the bores accommodating the pistons 109 and 110 could be chosen without departing from the scope of the present invention, provided that there results an effect of movement of the pistons in phase opposition on rotation of the arm in one direction or the other.

This effect is employed to pump hydraulic fluid into the housing 22 so as to establish by means of this hydraulic fluid a pressure in the chamber 90 operative on the brake piston 88.

To this end, as is seen particularly clearly on examining the piston 109 illustrated in FIG. 4, it being understood that the piston 110 is in all respects identical to the piston 109, each of the pistons 109 and 110 is hollow and has in the immediate vicinity of the corresponding cam follower 101, 102 a network of passages 131, 132 arranged so that these passages discharge continuously into the housing 22 wherever the cam follower 101, 102 touches the cam surface 98 within normal operating limits for the suspension system; within the respective piston each of the networks of passages 131, 132 discharges into an axial passage such as the passage 113 fitted with a check valve such as the valve 114 of a known design permitting passage of fluid from the channels such as 131 into the interior of the bores such as 105 through the channels such as 113 and preventing flow in the reverse direction; thus protrusion of the piston results in the feeding into the bores such as 105 of fluid from the housing 22 whereas retraction of the piston into the bore causes discharge of the fluid thus introduced through the intermediary of conduits such as 115 formed in the bores such as 105 in the immediate vicinity of the plugs such as 107 closing off the bores.

The conduit 115 and its counterpart 116 in the bore 106 comprise respective check valves 117, 118 of known type permitting fluid to flow in the direction out of the bores 105, 106 and preventing flow in the reverse direction, and the two conduits 115 and 116 are joined together on the output side of the check valves 117 and 118 relative to the permitted direction of flow to form a single conduit 119 from which branch the conduit 120 connected to the chamber 90 and two conduits 121 and 122 connected in parallel to a hydraulic fluid storage tank 123 which may consist of the housing 22 itself.

The conduit 121 comprises in series an adjustable relief valve 124 and the conduit 122 comprises an adjustable flow restriction used to establish an adjustable leakage flow through it; the restriction 125 may advantageously be conditioned by the respective downstream and upstream pressures in the conduit 122 so as to eliminate the effect of the viscosity of the fluid, in other words of temperature, on the leakage flowrate.

Thus when the arm 29 rotates in one direction or the other about the axis 8 relative to the support 4, one or other of the pistons 109, 110 feeds the conduit 119 with hydraulic fluid from the housing 22 at a flowrate dependent on the speed of displacement of the piston in its bore, that is to say on the speed of rotation of the arm relative to the support.

Passing through the restriction 125, this flow produces a pressure which is dependent on the head loss in the restriction and which is established uniformly in the conduits 119, 120, 121, 122 and consequently in the chamber 90, which applies to the brake linings 84 and brake disk sectors 82 a force directly proportional to the pressure in the conduit 119; by virtue of friction between the brake linings 84 and the brake disk sectors 82, this produces a damping force having about the axis 8 a damping moment opposing rotation of the arm 29 in the direction considered and proportional to the rotation speed; the head loss in the restriction 125 follows a substantially parabolic law so that small-amplitude movements of the pistons 109 and 110 in their respective bores have no effect on the piston 88, that is to say on the damping force due to pressurized contact between the friction linings 84 and the brake sectors 83.

Provided that the pressure in the conduits 119, 120, 121, 122 remains below the pressure that opens the relief valve 124, all of the flow of fluid is fed via the conduit 122 and the restriction 125 into the storage tank 123.

If the speed at which the arm 29 rotates about the axis 8 relative to the support 4 is sufficiently high for the fluid discharged by one or other of the pistons 109 and 110 according to the rotation direction to produce in the conduit 119 a pressure exceeding the threshold for opening the relief valve 124, which threshold is set according to a required maximum damping force, the fluid flows via the conduits 121 and 122 into the storage tank 123; the pressure in the conduits 119, 120, 121, 122 then remains constant and equal to the pressure that opens the relief valve 124; the damping force itself then remains constant at its maximum value.

The damping force substantially proportional to the pressure in the chamber 90, itself conditioned by the head loss created at 25 by the flow of fluid in the conduit 122, tends to be cancelled out as the flowrate reduces, that is to say in particular when the arm 29 is stationary relative to the support 4 between rotation in one direction and rotation in the opposite direction, since the two pistons 109 and 110 are then stationary; to maintain a residual flow through the restriction 125 in the conduit 122, that is to say to prevent virtually total cancellation of the damping force, during transient phases in which the direction of rotation of the arm 29 about the axis relative to the support 4 is reversed, there is preferably provided a pressure accumulator 130 connected to the conduit 119 by a conduit 129; the pressure accumulator 130 is dimensioned to have a negligible effect on the pressure in the chamber 90 when the arm 29 rotates about the axis 8 relative to the support 4, at this time possibly serving only as a filter to reduce the effects of variations in the flowrate due to movements of the pistons 109 and 110 at high frequency in their respective bores.

By varying the slope of the cam surface 98, in other words by assigning different values to the angle between tangents to the cam surface 98 at various points relative to radii joining these points to the axis 8, it is possible not only to condition the force with which the brake linings 85 are pressed against the brake disk sectors 82 according to the rotation speed of the arm 29 about the axis 8 relative to the support 4, but also according to the angular position of the arm 29 relative to the support 4 during such rotation, for example to increase the damping and so harden up the suspension when the arm is approaching is permissible limit amplitudes, in normal use, relative an an average position defined, for example, by the plane 38 being horizontal.

Also, differing in this respect from what has been described and shown, the cam surface 98 may have a shape which is asymmetrical relative to the plane 14 with which the plane of symmetry between the respective axes 103, 104 of the bores 105, 106 is coincident when the arm 29 occupies its position of static equilibrium, and/or to use different cross-sections of the pistons 109 and 110 so as to obtain different damping forces according to the direction of rotation of the arm 29 relative to the support 4.

By placing the brake disk sectors 82 and the linings 84 in the lower part of the housing 22 they are certain to be immersed at all times in the hydraulic fluid in the housing 22.

Thus these components are permanently lubricated and cooled.

To procure the same effect at the level of the slide member 55, the piston 47 and the journal 12, means may advantageously be provided to ensure that, despite temporary removal of hydraulic fluid from the housing and movement of the piston 47 in the liner 44, and whatever the temperature of the fluid, the housing 22 is filled to the maximum with hydraulic fluid at least in certain angular positions of the arm relative to the support, under normal operating conditions.

To this end there is advantageously provided within the housing 22 an elastically expandable, fluid-tight flexible material bladder 126 which contains a gas under pressure which, like the compressible fluid accommodated in the chambers 56 and 42, may advantageously by nitrogen; in a particularly advantageous manner the bladder is placed in the chamber 41 delimited internally of the cavity 32 by the bulkhead 40 so that, by virtue of this position, variations in the volume of the bladder 126 procure circulation of the hydraulic fluid from the housing 22 in the immediate vicinity of the brake linings 84 and brake disk sectors 82.

In alternative embodiments the bladder 126 could be complemented or replaced by accumulator means serving the same function and disposed appropriately.

The embodiments of the invention that have just been described constitute non-limiting examples only and numerous variations may be made to the arrangements which have just been described without departing from the scope of the present invention.

We claim:

1. Suspension unit for vehicles comprising:
    a support adapted to be fastened to a framework of the vehicle,
    a longitudinal arm,
    means coupling a rolling member to said arm defining a transverse first axis about which said rolling member rotates relative to said arm,
    means coupling said arm to said support defining a transverse second axis about which said arm rotates relative to said support, said second axis being parallel to said first axis and offset relative to it in a longitudinal direction,
    a longitudinal cylinder within said arm,
    a piston slidable longitudinally within said cylinder and delimiting with it a fluid-tight enclosure,
    a compressible fluid in said enclosure serving as spring means,
    a rod linking said piston and said support,
    means pivoting said rod to said support for rotation about a transverse third axis parallel to said second axis and offset relative to it transversely, and
    means pivoting said rod to said piston for rotation about a transverse fourth axis parallel to said third axis and comprising:
    a slide member sliding longitudinally within said cylinder and juxtaposed longitudinally to said piston on the same side as said rod,
    means pivoting said rod to said slide member to rotate about said fourth axis, and
    means coupling said slide member to said piston and permitting mutual transmission of longitudinal forces but not permitting mutual transmission of transverse forces.

2. System according to claim 1, wherein said means coupling said slide member to said piston comprise mutual abutment means operative in the direction in which said slide member and said piston move towards each other.

3. System according to claim 2, wherein said means pivoting said rod to said slide member comprise a member at the respective end of said rod which has in the direction towards said piston the shape of a body of revolution about said fourth axis and which constitutes longitudinal abutment means for said slide member against said piston.

4. System according to claim 2, further comprising a buffer attached to said piston facing towards said slide member and constituting abutment means for said piston against said slide member.

5. System according to claim 1, wherein said means pivoting said rod to said slide member for rotation about said fourth axis comprise a ball joint.

6. System according to claim 1, wherein said means pivoting said rod to said support for rotation about said third axis comprise a ball joint.

7. System according to claim 1, comprising means for injecting a lubricant between said slide member and said piston.

8. System according to claim 7, wherein said lubricant injecting means comprise means constituting a reserve of lubricant on the side of said slide member facing away from said piston and means for passing fluid between this side of said slide member and said side thereof facing towards said piston.

9. System according to claim 8, wherein said fluid passage means comprise longitudinal channels passing entirely through said slide member.

10. System according to claim 1, wherein said cylinder is defined by a longitudinal liner within and attached to said arm.

* * * * *